US012443686B1

(12) United States Patent
Balasubramanian et al.

(10) Patent No.: US 12,443,686 B1
(45) Date of Patent: Oct. 14, 2025

(54) SPURIOUS LESS DATA AUTHENTICATION BY METHOD MESH ENGINEERING USING DIGITAL GenAI WITH PROOF OF DIGITAL MANIPULATION (PODM)

(71) Applicant: Bank of America Corporation, Charlotte, NC (US)

(72) Inventors: Prabhakaran Balasubramanian, Tamilnadu (IN); Subburathinam Krishnan, Chennai (IN); Anantharajan Srinivasarangan, Chennai (IN); Kiran Pulla, Hyderabad (IN); Jenita Mercy, Chennai (IN); Durga Prasad Kutthumolu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 67 days.

(21) Appl. No.: 18/617,054

(22) Filed: Mar. 26, 2024

(51) Int. Cl.
G06F 21/31 (2013.01)

(52) U.S. Cl.
CPC ................................. G06F 21/31 (2013.01)

(58) Field of Classification Search
CPC .............................. G06F 21/31; G06F 21/125
See application file for complete search history.

(56) References Cited

U.S. PATENT DOCUMENTS

| 11,645,632 B2 | 5/2023 | La Salle |
| 11,743,268 B2 | 8/2023 | Coffing |

(Continued)

FOREIGN PATENT DOCUMENTS

| CN | 116257821 A | 6/2023 |
| CN | 113723220 B | 8/2023 |

(Continued)

OTHER PUBLICATIONS

S. Nandwani and D. A. Ostrowski, "Utilizing NFT Technology and Generative AI for Deep Fake Detection and Media Authentication," 2024 Conference on AI, Science, Engineering, and Technology (AIxSET), Laguna Hills, CA, USA, 2024, pp. 330-332. (Year: 2024).*

(Continued)

*Primary Examiner* — Kari L Schmidt
(74) *Attorney, Agent, or Firm* — Banner & Witcoff, Ltd.

(57) ABSTRACT

Systems and methods are disclosed to provide a security framework for the authentication of digital content and the prevention of unauthorized modifications, especially targeting the vulnerabilities introduced by deepfake technologies. It innovates by merging reverse engineering with expression manipulation detection to discern genuine from altered digital media. The process involves comparing historical data against synthetic or real-time content, generating a "video mesh" that enables precise manipulation identification. Enhanced by Smart Contracts for each content piece to record and verify changes, this system advances digital identity and transaction security significantly beyond current methodologies. Furthermore, it employs Generative AI within the Identity Intelligent Clip Reviewer to scrutinize blockchain-secured data for manipulation signs, issuing a Proof of Digital Manipulation (PODM) for verified authenticity. This comprehensive method ensures the integrity and trustworthiness of digital interactions across various platforms, marking a significant step forward in the protection against sophisticated cyber threats and unauthorized data alterations.

20 Claims, 7 Drawing Sheets

(56) References Cited

U.S. PATENT DOCUMENTS

| | | | |
|---|---|---|---|
| 11,922,532 B2* | 3/2024 | Alattar | G06V 40/16 |
| 12,321,495 B2* | 6/2025 | Khodadadeh | G06N 3/088 |
| 12,355,894 B2* | 7/2025 | Decoux | H04L 9/3239 |
| 2012/0281059 A1* | 11/2012 | Chou | H04L 12/1827 |
| | | | 348/E7.083 |
| 2019/0042988 A1* | 2/2019 | Brown | G06F 16/9535 |
| 2020/0143085 A1 | 5/2020 | Cooner | |
| 2021/0099772 A1 | 4/2021 | Lee et al. | |
| 2021/0127085 A1 | 4/2021 | Greaves | |
| 2021/0194699 A1 | 6/2021 | Tatonetti et al. | |
| 2021/0209203 A1* | 7/2021 | Ding | G06F 21/31 |
| 2021/0287322 A1* | 9/2021 | Yaffe | H04L 9/3247 |
| 2022/0036904 A1 | 2/2022 | Traynor et al. | |
| 2022/0337392 A1 | 10/2022 | Schauer | |
| 2022/0343006 A1* | 10/2022 | Ceballos Melo | G06F 21/6245 |
| 2022/0353082 A1 | 11/2022 | Busch | |
| 2022/0358902 A1 | 11/2022 | Zavesky et al. | |
| 2023/0172510 A1 | 6/2023 | Alford | |
| 2023/0196353 A1 | 6/2023 | Jakobsson et al. | |
| 2023/0237200 A1 | 7/2023 | Chitnis et al. | |
| 2023/0316809 A1* | 10/2023 | Matsumoto | G06V 40/174 |
| | | | 382/118 |
| 2023/0351051 A1 | 11/2023 | Woo et al. | |
| 2023/0421377 A1 | 12/2023 | Jakobsson et al. | |
| 2024/0064152 A1* | 2/2024 | Merchant | H04L 63/102 |
| 2024/0127630 A1* | 4/2024 | Michaeli | G06V 20/46 |
| 2025/0021982 A1* | 1/2025 | Devaraj | G06Q 20/4016 |
| 2025/0029169 A1* | 1/2025 | Klein | G06Q 30/0185 |
| 2025/0173724 A1* | 5/2025 | Silver | G06Q 20/389 |
| 2025/0175345 A1* | 5/2025 | Patel | H04L 9/50 |
| 2025/0200731 A1* | 6/2025 | Xu | H04N 7/141 |

FOREIGN PATENT DOCUMENTS

| | | |
|---|---|---|
| KR | 102213120 B1 | 2/2021 |
| KR | 20210035757 A | 4/2021 |
| KR | 102316079 B1 | 10/2021 |
| WO | 2021072403 A1 | 4/2021 |
| WO | 2023004159 A1 | 1/2023 |
| WO | 2023171831 A1 | 9/2023 |

OTHER PUBLICATIONS

H. R. Hasan and K. Salah, "Combating Deepfake Videos Using Blockchain and Smart Contracts," in IEEE Access, vol. 7, pp. 41596-41606, 2019. (Year: 2019).*

* cited by examiner

Process Diagram

SPURIOUS LESS DATA AUTHENTICATION BY METHOD MESH ENGINEERING USING DIGITAL GenAI WITH PROOF OF DIGITAL MANIPULATION (PODM)

TECHNICAL FIELD

The present disclosure relates to information security and, more particularly, to spurious less data authentication and prevention of unauthorized data modification.

DESCRIPTION OF THE RELATED ART

The invention addresses a critical and growing concern in the digital realm: the proliferation of advanced technologies that enable the creation of highly convincing fake digital content, including images, videos, and audio recordings. This phenomenon, largely driven by developments in artificial intelligence and machine learning, such as deepfake technology, poses significant threats to personal and organizational security. Deepfakes can be used to impersonate individuals in videos and audio recordings with a high degree of realism, leading to fraud, misinformation, and reputational damage. The capacity to manipulate digital content in a manner that is nearly indistinguishable from genuine media has escalated the urgency for effective detection and authentication methods.

The core problem solved by this invention is the authentication of digital content to ensure its veracity, thereby mitigating the risks associated with digital impersonation and content manipulation. Traditional security measures have struggled to keep pace with the sophistication of content manipulation techniques. As a result, there is a significant challenge in distinguishing authentic digital content from that which has been altered or fabricated. This gap in security measures exposes individuals and organizations to the risk of being deceived by manipulated content, which can have far-reaching consequences.

The surge in digital identity fraud, particularly through deepfake techniques, compromises the integrity of transaction authorization and authentication in decentralized finance, making it highly vulnerable. Current facial recognition systems for customer onboarding, including virtual verification processes, are at risk of being exploited by cyber fraudsters. Additionally, payment authorization is endangered as malicious users could potentially mimic an authenticated user's audio using deepfake technology to carry out transactions, posing a significant security threat.

There is a long felt and unmet need for a novel approach to securing digital content against unauthorized manipulation and impersonation through the use of advanced digital manipulation detection techniques. By employing reverse engineering and expression manipulation detection, the system is capable of comparing historical version data with current synthetic media or real-time video/audio bytes. This comparison generates a video mesh that serves as a basis for authentication, leveraging a specialized detection engine designed to identify discrepancies indicative of manipulation.

Furthermore, there is a need to enhance security through the implementation of Smart Contracts, which are assigned to each piece of digital content associated with a client. These contracts facilitate the authentication process by ensuring that any modification or access to the digital data is recorded and verifiable. This mechanism not only provides a robust layer of protection against unauthorized alterations but also introduces a transparent and immutable record of content manipulation attempts, thereby deterring potential fraudsters.

There is also a need to enhance the security of client digital data through Smart Contracts in order to effectively safeguard against information breaches and mitigates fraud associated with deepfake techniques. This approach is needed to significantly reduce vulnerabilities in both centralized and decentralized frameworks while also contributing to a lower carbon footprint, showcasing a sustainable and secure model for digital interactions.

Last, there is a need to address the sophisticated challenge of digital content manipulation by offering a comprehensive solution that integrates advanced detection methodologies with blockchain technology. By ensuring the authenticity of digital content and preventing unauthorized modifications, it provides a crucial tool in the fight against digital impersonation and fraud, thereby enhancing the integrity and trustworthiness of digital media in various applications, from customer onboarding and "know your customer" (KYC) processes to transaction authorizations in decentralized finance systems.

SUMMARY OF THE INVENTION

The invention introduces an advanced security solution for authenticating digital content and preventing unauthorized modifications, particularly in the context of deepfake technologies. It employs a novel approach that combines reverse engineering and expression manipulation detection techniques to differentiate between authentic and altered digital media. Through the comparison of historical data with synthetic media or real-time audio/video bytes, a video mesh is generated, facilitating accurate detection of manipulations. Additionally, the use of Smart Contracts for each piece of digital content enhances security by ensuring any modifications are recorded and verifiable. This method provides a robust framework for securing digital identities and transactions, offering a significant advancement over existing detection and authentication technologies.

The methodology expands upon the concept of safeguarding digital content by intricately analyzing and detecting manipulations in digital expressions. Through reverse engineering, this approach meticulously compares existing historical data with newly generated synthetic media or live-streamed audio/video feeds. This comparison is essential for identifying discrepancies that signal manipulation. The process culminates in the creation of a 'video mesh', a detailed digital framework produced by a specialized detection engine designed for this purpose. This 'video mesh' acts as a forensic tool, offering a visual and data-driven means to pinpoint and document manipulations in digital expressions, thereby ensuring the content's authenticity and integrity. This advanced technique enhances digital security by providing a reliable method to detect unauthorized alterations, crucial for maintaining trust in digital interactions and communications.

Digital data, once authenticated from clients through diverse channels such as ATMs, mobile applications, IoT devices, and various forms of mixed reality technology (Virtual Reality, Augmented Reality, Mixed Reality), undergoes a secure uploading process. Upon upload, each data set is intricately linked with a unique Smart Contract, significantly bolstering its security framework, and ensuring traceability. This process embeds the data within a blockchain framework, offering unparalleled security against tampering. Subsequently, this blockchain-secured data is scrutinized by the Identity Intelligent Clip Reviewer, a cutting-edge system equipped with advanced Generative AI (GenAI) technology. This system is specifically designed to conduct thorough examinations of the digital data for any potential signs of manipulation, issuing a Proof of Digital Manipulation (PODM) as a form of verification. Through this elaborate and secure process, the integrity and authenticity of digital identities are meticulously maintained, providing a solid defense mechanism against the prevalent threats of fraud and unauthorized data alterations in the digital sphere. This comprehensive approach signifies a leap forward in securing digital identities, ensuring trust and reliability in digital transactions and interactions across various platforms.

Reverse engineering, as utilized herein, here involves an advanced analytical process tailored to scrutinize the authenticity of digital content through historical data comparison. Utilizing the Engineered Mesh Expression Manipulation Detection Engine, this method meticulously contrasts a user's past digital expressions with current uploads. The engine's sophisticated technology is designed to detect any alterations or manipulations, thereby validating the genuineness of the content. This ensures that the digital representation remains true to the user's original expressions, safeguarding against potential fraud and maintaining the integrity of digital identities and communications. Through this detailed examination, the system provides a crucial layer of security in the digital domain, where authenticity and trust are paramount.

The Smart Contract is scrutinized within the framework of the Identity Intelligent Clip Reviewer, which is equipped with digital Generative AI technology capable of detecting proofs of digital manipulation (PODM). This rigorous examination process leverages the advanced capabilities of GenAI to ensure that the digital data linked to the Smart Contract remains unaltered and authentic. Through this method, any unauthorized changes can be identified and documented, providing a secure and trustworthy digital environment for handling sensitive information.

For each piece of digital data authenticated for a client, a unique Smart Contract is designated, serving a critical role in ensuring data integrity and security. This exclusive assignment facilitates a precise comparison process during reverse engineering, allowing for a meticulous examination of the data's authenticity. By employing this method, the system can effectively detect and counter any unauthorized modifications, safeguarding the client's digital information against potential security breaches. This approach underscores the commitment to maintaining the highest standards of digital security and data protection.

The methodology for detecting expression manipulation has been integrated into the system's framework, which utilizes reverse engineering to scrutinize stored digital data. This integration facilitates a thorough examination of digital content to identify any unauthorized alterations, ensuring the data's authenticity and reliability. By implementing this approach, the system enhances its ability to safeguard digital information against manipulation, providing a robust mechanism for maintaining data integrity in a digital environment increasingly susceptible to sophisticated forms of cyber threats.

By attaching a unique Smart Contract to each segment of digital data, such as recordings for hand or voice recognition and clips for motion or signature verification, this method significantly enhances data security. This strategy employs blockchain technology to embed a layer of cryptographic protection, ensuring that each data piece is verifiable and tamper evident. This not only secures sensitive information against unauthorized access and manipulation but also establishes a transparent and immutable record of the data's authenticity and integrity, thereby bolstering trust in digital interactions.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a method for authenticating digital data against manipulations encompasses a series of comprehensive steps designed to ensure the integrity and authenticity of digital content. This method initiates by receiving digital data from users through an omnichannel input process, accommodating a broad spectrum of user interaction modes by facilitating the reception of data via various platforms, including mobile applications, Internet of Things (IoT) devices, web interfaces, and online services. The received digital data, which may include video files, audio files, or textual content files, then undergoes a preprocessing process aimed at standardizing its format for further analysis. This preprocessing involves converting formats to a unified standard format, adjusting resolution to meet analysis requirements, filtering noise to enhance clarity, and segmenting the data into manageable parts.

Following the standardization, the preprocessed digital data is associated with a unique smart contract through a smart contract association process. This step involves generating a unique identifier for the data via cryptographic hashing and embedding this identifier within a blockchain-based smart contract, thereby ensuring an immutable record of the data's authenticity. To provide a robust framework for comparison, the method includes retrieving historical data corresponding to the user or the type of digital data. This retrieval leverages content delivery networks (CDNs) and optimized data storage solutions to quickly access extensive datasets of authenticated data.

An engineered mesh representation of the preprocessed digital data is then generated, mapping out key features and expressions pertinent to the data's authenticity. This engineered mesh generation process creates a detailed structural model for video data or a spectral graph for audio data, enabling a comprehensive analysis of the data's originality. Specific features are extracted from this engineered mesh for manipulation detection analysis. The feature extraction employs deep neural networks to identify and isolate features indicative of potential manipulations, focusing on anomalies in facial expressions, voice modulation, and textual consistency.

The extracted features are compared against the historical data to identify discrepancies indicative of manipulations through a manipulation detection analysis process. This process utilizes advanced artificial intelligence (AI) and machine learning models trained on datasets of both authentic and manipulated content, ensuring high accuracy in detecting deepfake technology and other forms of digital tampering. Additionally, the method involves reinterpreting the features or expressions of the digital data in various contexts to uncover subtle manipulations. This model paraphrasing process includes linguistic analysis for textual data and dynamic analysis for video and audio data, allowing for the detection of manipulations that may not be apparent in static analysis.

A decision on the authenticity of the digital data is then made based on the manipulation detection analysis and model paraphrasing. This authentication decision process incorporates a confidence scoring mechanism to evaluate the degree of similarity between the current data and historical benchmarks, setting thresholds for automatically flagging potential manipulations. Following this decision, the associated smart contract is updated with the outcome of the authentication decision, securing a record of the process and its result. This smart contract update process includes recording the decision on the blockchain, thereby ensuring transparency and non-repudiation of the authentication outcome. Finally, the method concludes by outputting the authentication decision and triggering security protocols if manipulation is detected. This output process involves notifying the user via multiple communication channels, including email and SMS, and implementing a multi-factor authentication process to verify the user's identity and intent, thus ensuring a secure and user-informed response to detected manipulations.

In some arrangements, a system designed for authenticating digital data against manipulations is composed of several interconnected modules, each playing a crucial role in ensuring the security and authenticity of digital content. At the outset, the system features an omnichannel input module. This module is adept at receiving a variety of digital data forms from users, including but not limited to video files, audio files, or textual content files. Its configuration allows for a seamless reception of data across diverse platforms, catering to a wide user base engaging through mobile applications, Internet of Things (IoT) devices, and online services.

Once the digital data is received, a preprocessing module takes charge, tasked with standardizing the format of this data to prepare it for thorough analysis. This involves a suite of functionalities such as format conversion to bring diverse data types to a unified format, resolution adjustment to meet predefined analysis criteria, noise filtering to enhance data clarity, and segmenting the data into manageable chunks for efficient processing.

Following the preprocessing, the digital data is associated with a unique smart contract through a dedicated smart contract module. This association is crucial for maintaining the data's integrity and authenticity across the authentication process, leveraging blockchain technology to ensure an immutable record of the data's authenticity. Parallelly, a historical data module is employed to retrieve historical data pertinent to the user or the type of digital data. This retrieval is instrumental in establishing a benchmark for the authentication process, utilizing content delivery networks (CDNs) and optimized data storage solutions for quick access to extensive datasets of authenticated data.

Regarding the data's authenticity, an engineered mesh generation module generates an engineered mesh representation of the preprocessed digital data. This representation intricately maps out key features and expressions significant to the data's authenticity, whether it be creating a detailed structural model for video data or a spectral graph for audio data. Subsequently, a feature extraction module extracts specific features from this engineered mesh. These features are critical for manipulation detection analysis, with deep neural networks employed to identify and isolate potential manipulations, focusing keenly on anomalies across facial expressions, voice modulation, and textual consistency.

The manipulation detection analysis module then steps in, utilizing advanced AI and machine learning models to compare the extracted features against historical data. This comparison aims to identify discrepancies indicative of manipulations, ensuring high accuracy in detecting deepfake technology and other forms of digital tampering. In cases where manipulations may not be immediately apparent, a model paraphrasing module reinterprets the features or expressions of the digital data in various contexts, thereby uncovering subtle manipulations through processes including linguistic analysis for textual data and dynamic analysis for video and audio data.

An authentication decision module is responsible for making a final decision on the authenticity of the digital data, basing this decision on the comprehensive manipulation detection analysis and model paraphrasing. Following this decision, a smart contract update module updates the associated smart contract with the outcome of the authentication decision. This step is pivotal in securing a record of the process and its result, with the decision recorded on the blockchain to ensure transparency and non-repudiation. Lastly, an output module outputs the authentication decision and, if manipulations are detected, triggers security protocols. This includes notifying the user via multiple communication channels such as email and SMS and implementing a multi-factor authentication process to verify the user's identity and intent, thus ensuring a secure and informed response to detected manipulations.

In some arrangements, within the described system for authenticating digital data against manipulations, enhancements and specific functionalities are integrated at various stages to bolster the system's efficiency and reliability. Starting from the omnichannel input module, the system includes integration with mobile applications, Internet of Things (IoT) devices, and online services. This integration is pivotal for facilitating the seamless reception of digital data from a comprehensive range of user interfaces, ensuring that users can conveniently submit data for authentication regardless of the platform they use.

Moving forward, the smart contract module within the system employs a blockchain platform for the creation and management of the unique smart contracts associated with each piece of digital data. This utilization of blockchain technology significantly enhances the transparency and security of the data authentication process. It ensures that every transaction and data verification process is recorded in an immutable ledger, providing a clear audit trail and bolstering trust in the authentication outcomes.

Furthermore, the manipulation detection analysis module is equipped with a temporal analysis feature. This feature is designed to analyze changes in the digital data over time, enabling the system to detect manipulations that may not be evident in static analysis. This temporal analysis is critical for identifying sophisticated manipulations that alter data subtly over sequences or periods, thereby enhancing the system's ability to ensure the authenticity of dynamic digital content.

Moreover, the model paraphrasing module includes a linguistic analysis tool specifically for textual content. This tool is configured to perform syntax and semantic analysis, making it possible to detect generated or manipulated textual data. By analyzing the structure and meaning of text, the system can identify inconsistencies or anomalies that suggest manipulation, providing a crucial layer of scrutiny for text-based data.

Additionally, the output module of the system is configured to actively notify users via multiple communication channels, including email and SMS. It also implements a multi-factor authentication process for users when manipulation is detected in the submitted digital data. This proactive approach ensures that users are immediately informed about potential security issues and can take necessary actions to verify their identity and confirm the authenticity of their submissions, thereby maintaining a high level of security and user engagement.

In another enhancement to the system, the preprocessing module includes an image and audio enhancement feature that employs machine learning techniques. These techniques are used to improve the clarity and definition of visual and auditory elements within the digital data. By enhancing the quality of the data before analysis, the system facilitates more precise feature extraction and manipulation detection, ensuring that subtle manipulations are not overlooked due to poor data quality.

Lastly, the feature extraction module is specifically configured to utilize convolutional neural networks (CNNs) for the analysis of video files and recurrent neural networks (RNNs) for the analysis of audio files. This configuration enables the system to identify nuanced patterns indicative of digital manipulation that might be missed by traditional analysis methods. Through the advanced capabilities of CNNs and RNNs, the system achieves a deeper understanding of the content, allowing for the detection of complex manipulations in video and audio data, thereby ensuring a comprehensive and robust authentication process.

In some arrangements, a method is outlined for authenticating digital data against manipulations, incorporating a series of detailed steps aimed at ensuring the integrity and authenticity of digital content. This method begins with the reception of digital data from a user through an omnichannel platform, capable of handling a diverse array of digital data types, including video files, audio files, or textual content files. This initial step ensures that users can submit their data for authentication using a variety of platforms, reflecting the versatile nature of digital interactions today.

In some arrangements, the method for authenticating digital data against manipulations incorporates several refined steps, each designed to enhance the reliability and effectiveness of the authentication process. Within this method, the preprocessing step is expanded to include the enhancement of the clarity and definition of the digital data. This enhancement is achieved through the use of advanced digital signal processing techniques, which are instrumental in facilitating more accurate feature extraction by improving the quality of the data prior to analysis.

Following this enhanced preprocessing, the creation of the unique smart contract takes place on a blockchain platform. This choice of platform provides a decentralized verification mechanism, significantly enhancing the security and transparency of the digital data's authenticity. The use of a blockchain platform ensures that the authentication process benefits from the inherent security features of blockchain technology, including immutability and transparency.

The method further involves the use of cryptographic hash functions to generate a unique identifier for the preprocessed digital data before its association with the smart contract. This step is crucial for ensuring the data's integrity from the point of upload, providing a secure means of linking the digital data to its corresponding smart contract and maintaining the authenticity of the data throughout the authentication process.

Moreover, the retrieval of historical data is optimized through the use of a content delivery network (CDN). This optimization significantly reduces latency in accessing large datasets, thereby speeding up the authentication process. By utilizing a CDN, the method benefits from improved access speeds to extensive datasets of authenticated data, which serve as a benchmark for comparing and authenticating the submitted digital data.

In terms of analysis, the engineered mesh representation generated as part of the method includes a three-dimensional model for video data or a spectral graph for audio data. This representation enables a multi-dimensional analysis of the digital data, greatly enhancing the detection of manipulations. The depth provided by three-dimensional models and spectral graphs allows for a more thorough examination of the data's authenticity, particularly in detecting sophisticated manipulations.

The feature extraction process within this method employs deep neural networks trained specifically to identify discrepancies between the digital data and its historical counterparts. This focus on subtle manipulations indicative of advanced deepfake technologies allows the method to detect and analyze manipulations that might otherwise go unnoticed, ensuring a high level of accuracy in authentication.

Furthermore, the method incorporates temporal analysis of the digital data. This analysis examines changes over time to detect manipulations that may not be evident in a single frame or segment, adding a dynamic component to the manipulation detection analysis. By considering the temporal aspect of the data, the method can identify sophisticated manipulation techniques that alter the data gradually or intermittently.

The model paraphrasing step within the method includes linguistic analysis for textual content. This analysis focuses on syntax and semantics to detect unnatural patterns or inconsistencies that could indicate text-based manipulation or generated content. By examining the linguistic structure and meaning of textual data, the method enhances its ability to detect manipulations in text.

Deciding on the authenticity of the digital data involves a confidence scoring mechanism. Scores are assigned based on the degree of similarity to historical data, with thresholds set to automatically flag potential manipulations. This scoring mechanism provides a quantifiable measure of the data's authenticity, facilitating an objective decision-making process.

Finally, if manipulations are detected, the method triggers security protocols that include notifying the user via multiple channels, such as email and SMS. Additionally, a secondary form of verification is required before proceeding with any transaction or interaction. This multilayered response ensures that users are promptly informed of potential security issues and can take necessary steps to verify their data, maintaining the integrity and security of the authentication process.

Following the reception of digital data, the method involves preprocessing this data to standardize its format for subsequent analysis. This preprocessing includes a range of operations such as format conversion to ensure uniformity across different data types, resolution adjustment to optimize data for analysis, noise filtering to enhance data clarity, and segmenting the data into manageable parts for detailed examination. This meticulous preparation of the data is crucial for accurate analysis and detection of manipulations.

Next, the preprocessed digital data is associated with a unique smart contract. This step is pivotal in securing the data's integrity and authenticity throughout the authentication process. The smart contract acts as a digital seal, maintaining the security of the data from the moment of submission through to the conclusion of the authentication process. This association involves generating a unique identifier for the data via cryptographic hashing and embedding this identifier within a blockchain-based smart contract, thereby ensuring an immutable and transparent record of the data's authenticity.

The method also includes retrieving historical data corresponding to the user or the type of digital data submitted. This historical data, which comprises previously authenticated versions of similar data types, serves as a benchmark for the authentication process. It provides a critical reference point against which the submitted data can be compared, ensuring a robust framework for detecting manipulations.

An engineered mesh representation of the preprocessed digital data is then generated. This engineered mesh maps out key features and expressions pertinent to the data's authenticity, creating a detailed structural model that facilitates a comprehensive analysis of the data's originality. Specific features indicative of potential manipulations are extracted from this engineered mesh for manipulation detection analysis. This extraction employs advanced artificial intelligence (AI) and machine learning models to isolate features that may signify tampering with the digital content.

A manipulation detection analysis is conducted on the extracted features, comparing them against the historical data to identify discrepancies indicative of manipulations. This analysis utilizes advanced AI and machine learning models trained on datasets of both authentic and manipulated content, ensuring high accuracy in the detection of digital tampering, including deepfake technology.

Furthermore, the method involves employing model paraphrasing to reinterpret the features or expressions of the digital data in various contexts. This step aims to uncover subtle manipulations not immediately evident through direct comparison, providing an additional layer of scrutiny that enhances the system's ability to authenticate digital content accurately.

Based on the comprehensive analysis provided by the manipulation detection and model paraphrasing, an authentication decision is made. This decision determines the authenticity of the digital data, setting thresholds for automatically flagging potential manipulations and ultimately deciding whether the data can be considered authentic.

Following the authentication decision, the associated smart contract is updated with the outcome of this decision, securing a record of the authentication process and its result. This update ensures the transparency and non-repudiation of the authentication outcome, maintaining an immutable ledger of the process.

Finally, the method concludes by outputting the authentication decision. If the digital data is verified as authentic, it is approved for its intended use. Conversely, if manipulation is detected, security protocols are triggered to address the manipulation. This includes notifying the user via multiple communication channels, such as email and SMS, and potentially implementing a multi-factor authentication process to further verify the user's identity and intent. This comprehensive approach ensures a secure and informed response to any detected manipulations, maintaining the integrity of the digital authentication process.

The following description and the appended claims, with reference to the accompanying drawings, which all form a part of this specification and where like reference numerals designate corresponding parts in the various figures, will make these and other features and characteristics of the current technology, as well as the methods of operation and functions of the related elements of structure and the combination of parts and economies of manufacture, more apparent. As computer-executable instructions (or as computer modules or in other computer constructs) recorded on computer-readable media, one or more of the different procedures or processes described herein may be implemented in whole or in part. Steps and functionality might be carried out on a single machine or dispersed over several devices that are connected to one another. However, it is clearly recognized that the drawings are meant primarily for descriptive and illustrative purposes and are not meant to define the boundaries of the invention. Unless the context makes it obvious otherwise, the single forms of "a," "an," and "the" as they appear in the specification and claims include plural referents.

DETAILED DESCRIPTION

Figure 1:
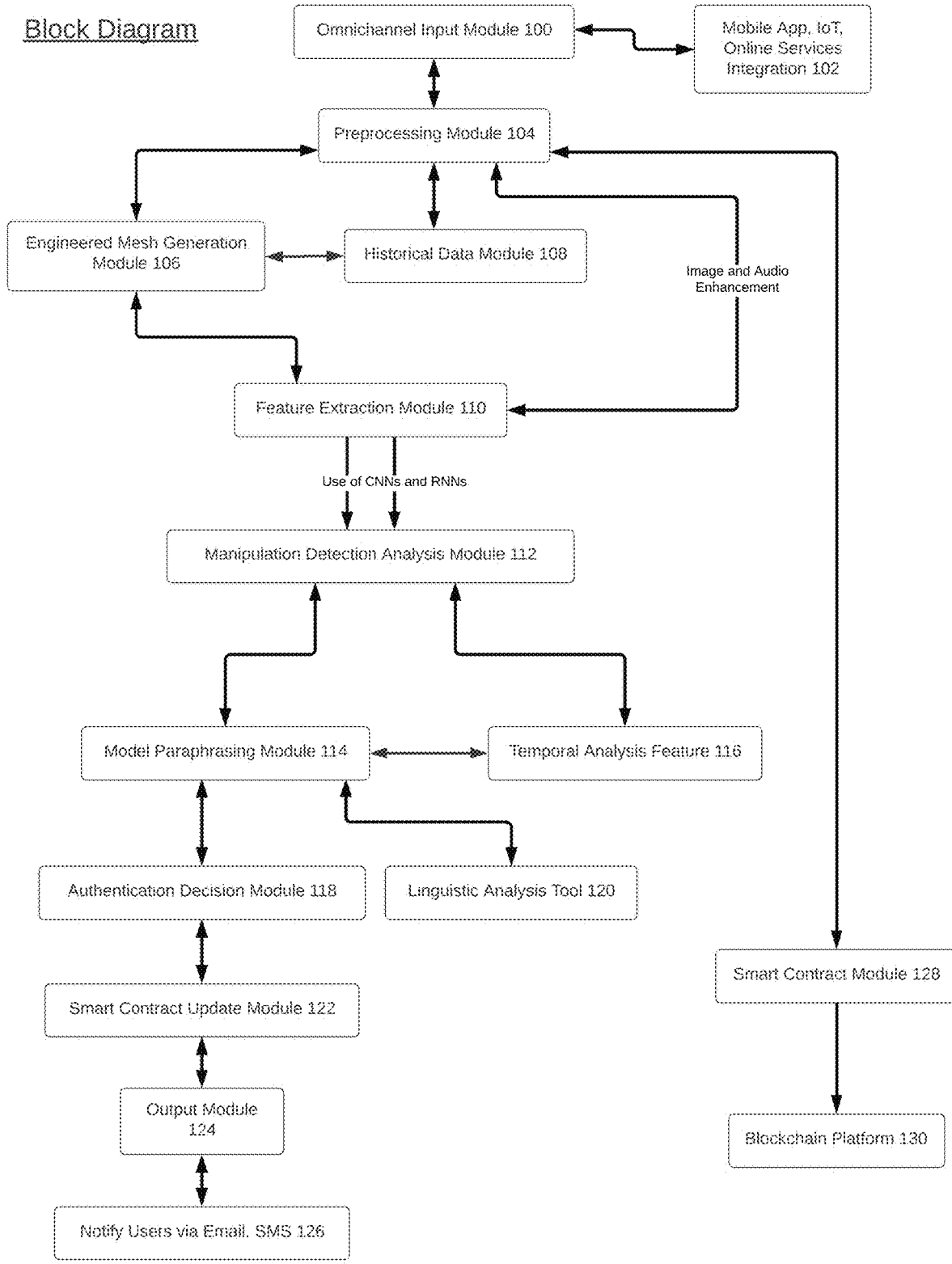
FIG. 1 depicts a sample block diagram in accordance with one or more aspects of this disclosure that introduces the components of an exemplary system, including the Omnichannel Input Module, Preprocessing Module, Engineered Mesh Generation Module, Feature Extraction Module (utilizing CNNs and RNNs), Manipulation Detection Analysis Module, Model Paraphrasing Module, Authentication Decision Module, and Smart Contract Update Module. It illustrates the flow from data input through authentication decision and update of smart contracts on a blockchain platform.

The following account of various example embodiments is designed to fulfill the objectives mentioned earlier, with reference to the accompanying illustrations that are relevant to this disclosure. These illustrations demonstrate multiple systems and methods for implementing the disclosed information. It is important to acknowledge that there are alternative implementations possible, and adjustments to both structure and functionality can be applied. The description outlines various links between elements, which are to be interpreted broadly. Unless specified otherwise, these connections can be either direct or indirect, and may be established through wired or wireless means. This document does not intend to limit the nature of these connections.

Terms like "computers," "machines," and similar phrases are interchangeably used herein, depending on the context, to refer to devices that can be general-purpose or specialized, designed for particular functions, either virtual or physical, or capable of connecting to networks. This includes all relevant hardware, software, and components familiar to those with expertise in the area. Such devices may be outfitted with specialized circuits like application-specific integrated circuits (ASICs), microprocessors, cores, or other processing units to execute, access, control, or implement various types of software, instructions, data, modules, processes, or routines as mentioned. The usage of these terms in the text is not intended to be limiting or exclusive to any specific kinds of electronic devices or components and should be interpreted in the widest sense by those with relevant expertise. Specific details on computer/software components, machines, etc., are not provided for the sake of brevity and under the assumption that such information is within the realm of understanding of skilled professionals in the domain.

Software, executable code, data, modules, procedures, and similar components can be housed on tangible, computer-readable physical storage devices. This encompasses everything from local memory and network-attached storage to diverse forms of memory that are accessible, whether they are removable, remote, cloud-based, or available via other channels. These components can be saved on both volatile and non-volatile memory and might operate under various conditions, including autonomously, upon request, according to a predetermined schedule, spontaneously, proactively, or in response to specific triggers. They can be stored together or distributed among several computers or devices, incorporating their memory and other parts. Moreover, these components can be housed or disseminated across network-accessible storage systems, within distributed databases, big data frameworks, blockchains, or distributed ledger technologies, either collectively or through distributed arrangements.

The phrase "networks" or similar terms refer to a broad range of communication systems, such as local area networks (LANs), wide area networks (WANs), the Internet, cloud-based networks, and both wired and wireless networks. This category also includes specialized networks like digital subscriber line (DSL) networks, frame relay networks, asynchronous transfer mode (ATM) networks, and virtual private networks (VPN), which may be interconnected in various ways. Networks are designed with specific interfaces to support different types of communications—internal, external, and managerial—with the capability to allocate virtual IP addresses (VIPs) to these interfaces as necessary. The architecture of a network is built upon an array of hardware and software elements. This includes, but is not limited to, access points, network adapters, buses, both wired and wireless ethernet adapters, firewalls, hubs, modems, routers, and switches, which may be positioned within the network, on its periphery, or outside. Software and executable instructions work on these components to enable network operations. Additionally, networks support HTTPS and a variety of other communication protocols, making them suitable for packet-based data transmission and communication.

As used herein, Generative Artificial Intelligence (AI) or the like refers to AI techniques that learn from a representation of training data and use it to generate new content that is similar to or inspired by existing data. Generated content may include human-like outputs such as natural language text, source code, images/videos, and audio samples. Generative AI solutions typically leverage open-source or vendor sourced (proprietary) models, and can be provisioned in a variety of ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used in accordance with various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in the field of biology and medicine. (5) NVIDIA AI Models—Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in the field of generative AI. One or more of the foregoing may be used herein as desired. All are considered to be within the sphere and scope of this disclosure.

Generative AI and LLMs can be used in various aspects of this disclosure performing one or more various tasks, as desired, including: (1) Natural Language Processing (NLP):

This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and utilizing large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

At a high level, the inventions disclosed herein introduce a comprehensive method and system for authenticating digital data against manipulations, catering to the ever-increasing challenges posed by sophisticated digital tampering techniques, including deepfakes. At its core, the invention seamlessly integrates an array of technological advancements and methodologies, from omnichannel data reception to advanced artificial intelligence (AI) analysis, ensuring a robust defense mechanism against the manipulation of digital content. This invention is pivotal in maintaining the integrity and authenticity of digital data across various sectors, including but not limited to, banking, security, and digital media, where the veracity of digital content is paramount.

Central to this invention is the utilization of an omnichannel input module or process that facilitates the reception of digital data from users across a multitude of platforms. This inclusivity ensures that users can submit their data for authentication regardless of the device or service they are using, thereby enhancing user accessibility and convenience. Following data submission, the invention employs a preprocessing step that standardizes the format of the received data, making it suitable for detailed analysis. This preprocessing includes format conversion, resolution adjustment, and noise filtering, among other techniques, to optimize the data for the subsequent authentication processes.

A distinctive feature of this invention lies in its employment of a unique smart contract for each piece of digital data processed. This smart contract serves to secure the data's integrity and authenticity throughout the authentication process, leveraging blockchain technology to provide an immutable and transparent record of the data's verification. This blockchain-based approach not only enhances the security of the authentication process but also introduces a decentralized verification mechanism that adds an additional layer of trust and reliability to the system.

The authentication process itself is underpinned by sophisticated AI and machine learning models that conduct a thorough analysis of the digital data. This includes generating an engineered mesh representation of the data, extracting specific features indicative of potential manipulations, and comparing these features against historical data to identify discrepancies. Furthermore, the invention incorporates model paraphrasing techniques, including linguistic analysis for textual content, to uncover subtle manipulations that may not be immediately evident. This comprehensive analysis ensures high accuracy in detecting manipulations, thereby affirming the authenticity of the digital content.

Upon concluding the analysis, the invention outputs an authentication decision, updating the associated smart contract with the outcome and, if necessary, triggering security protocols to address detected manipulations. This includes notifying the user through multiple communication channels and implementing multi-factor authentication processes to verify the user's identity and intent. The invention's ability to notify users and require additional verification steps in the event of detected manipulations ensures a secure and user-informed response, maintaining the integrity and trustworthiness of the digital authentication process. Through its innovative integration of technology and methodology, this invention provides a vital solution to the challenges of digital data authenticity in an increasingly digitalized world.

By way of non-limiting disclosure, FIG. 1 presents a comprehensive block diagram of a digital data authentication system designed to address and mitigate the risks posed by deepfake technology and unauthorized content manipulation. This system is structured to process and authenticate digital content, from initial input through to decision output, by employing a series of interconnected modules, each with specialized functionalities. Here's a detailed discussion of each component and its role within the system.

Omnichannel Input Module (100): This module underscores the system's versatility in handling data across diverse digital touchpoints. By accommodating a wide range of input sources, the system ensures comprehensive compatibility and responsiveness to various digital platforms. This adaptability is crucial in today's fragmented digital ecosystem, where users interact across multiple devices and services. The ability to process data from mobile apps, IoT devices, and online services (102) in a unified manner underscores the system's readiness to meet the challenges posed by the multiplicity of digital channels.

Preprocessing Module (104): The preprocessing step is foundational, ensuring that incoming data is optimized for analysis. This involves a series of critical adjustments, such as format conversion and noise reduction, aimed at enhancing data quality. High-quality data is essential for accurate analysis, particularly when identifying subtle manipulations. By refining the data upfront, the system lays the groundwork for more effective detection and analysis downstream.

Engineered Mesh Generation Module (106) & Historical Data Module (108): The engineered mesh is a sophisticated digital representation that captures the essence of the input data, enabling detailed scrutiny. This mesh, when juxtaposed with historical data, becomes a powerful tool for detecting anomalies. Historical data serves as a benchmark, providing a reference point against which new inputs are evaluated.

The interplay between these modules facilitates a nuanced analysis capable of identifying even the most sophisticated manipulations.

Feature Extraction Module (110): Employing CNNs and RNNs for feature extraction represents the cutting edge of AI technology in pattern recognition. This module's ability to isolate key features from complex data sets is vital for detecting manipulations. These neural networks excel in identifying patterns and anomalies within data, making them invaluable tools in the system's arsenal against digital fraud.

Manipulation Detection Analysis Module (112): At the core of the system, this module's role in identifying discrepancies cannot be overstated. Advanced analytical techniques enable the system to discern between authentic and manipulated content. This differentiation is crucial in maintaining the integrity of digital interactions and transactions, offering a robust defense against the pervasive threat of digital manipulation.

Model Paraphrasing Module (114) & Temporal Analysis Feature (116): These features introduce additional layers of analysis, enhancing the system's ability to detect manipulation through recontextualization and temporal examination. By reinterpreting data and analyzing it over time, the system can uncover manipulations that might otherwise go unnoticed. These capabilities underscore the system's comprehensive approach to authentication, leveraging multiple analytical perspectives for a more accurate assessment.

Authentication Decision Module (118) & Linguistic Analysis Tool (120): The decision-making process is informed by a comprehensive analysis, incorporating linguistic scrutiny for textual content. This holistic approach ensures that decisions are based on a thorough examination of all data aspects, from visual and auditory elements to textual nuances. The integration of linguistic analysis highlights the system's meticulous attention to detail and its capacity to adapt its analytical techniques to the data type.

Smart Contract Update Module (122), Smart Contract Module (128), & Blockchain Platform (130): The integration with blockchain technology embodies the system's commitment to security and transparency. By leveraging smart contracts and blockchain, the system not only enhances the authentication process's integrity but also ensures that all actions are recorded in an immutable ledger. This approach offers unparalleled security benefits, including tamper-evidence and auditability, which are critical in building trust in digital environments.

The FIG. 1 block diagram encapsulates a comprehensive, multi-layered approach to securing digital content against manipulation. Through the integration of advanced AI technologies, blockchain, and meticulous data analysis techniques, the system offers a robust solution to the challenges posed by digital manipulation. This innovative approach not only enhances the security of digital interactions but also establishes a new standard in the authentication of digital content, reinforcing trust and integrity in the digital age.

Figure 2:
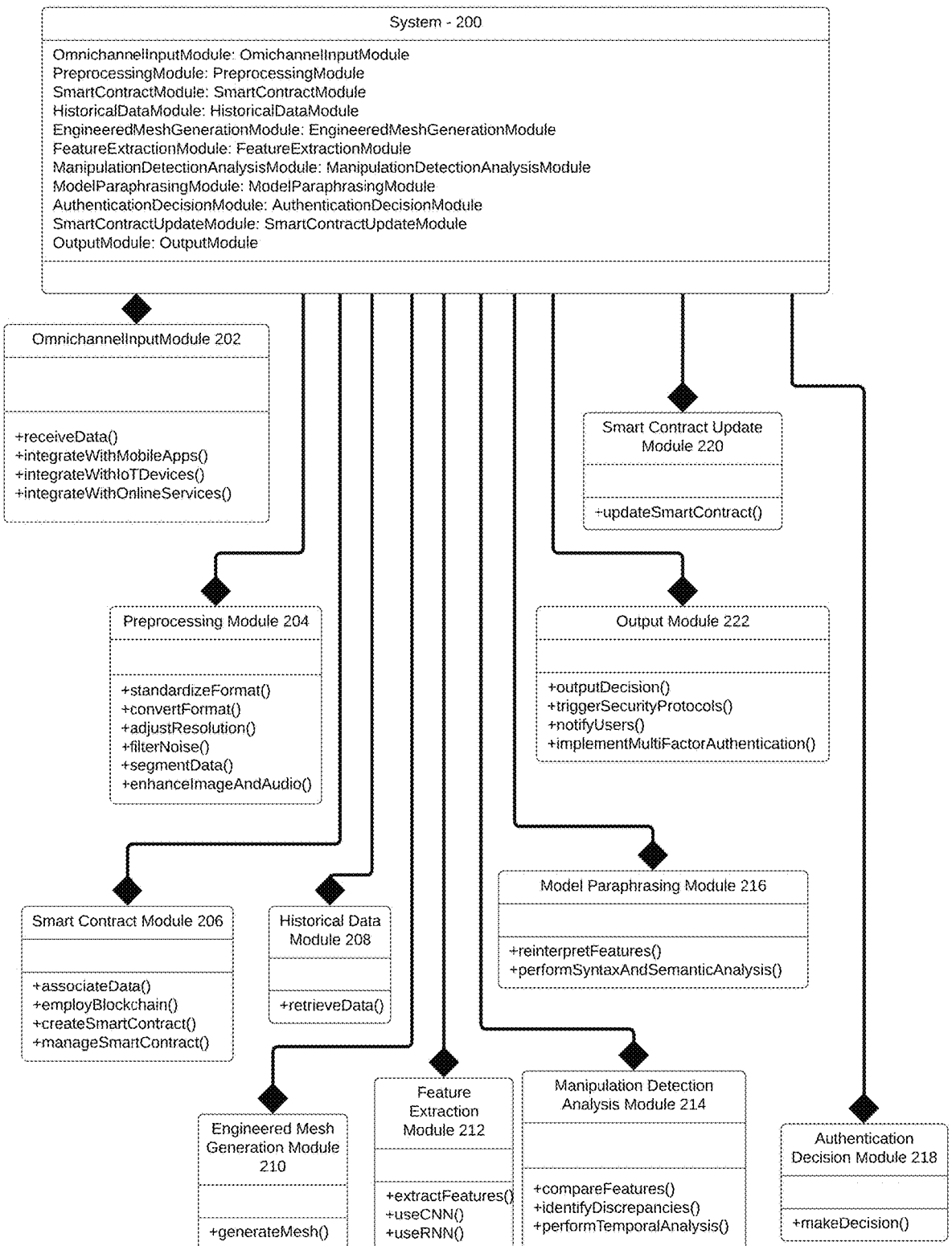
FIG. 2 depicts a sample class diagram of an exemplary system architecture, specifying classes such as the Omnichannel Input Module, Smart Contract Module, Historical Data Module, among others. It includes methods for data reception, preprocessing, smart contract management, engineered mesh generation, feature extraction, manipulation detection, model paraphrasing, and making authentication decisions.

By way of non-limiting disclosure, FIG. 2 outlines a class diagram for a digital data authentication system, focusing on its object-oriented design and the interactions between different components within the system. This diagram details the architecture and functionality of the system through a blueprint of its classes and their relationships, showing how data flows and is processed through various modules. Here's a detailed discussion and explanation of each component and its role within the system.

System (200): Represents the overarching framework or the entire authentication system, encapsulating all modules and their interactions. It's the root class that ties together various components for a cohesive operation.

Omnichannel Input Module (202): This module is responsible for collecting data from multiple sources, ensuring that the system can handle inputs from a variety of channels like mobile apps, IoT devices, and online services. It serves as the system's entry point for data to be authenticated. This module's capability to integrate seamlessly with various digital platforms (mobile apps, IoT devices, online services) is crucial in today's interconnected digital ecosystem. It ensures the system's accessibility and adaptability, allowing users to submit data for authentication from their preferred platforms. The diversity of data sources underscores the need for robust preprocessing mechanisms to standardize and normalize the wide range of input formats and qualities. The methods include: +receiveData( ), +integrateWithMobileApps( ), +integrateWithIoTDevices( ), +integrateWithOnlineServices( ).

Preprocessing Module (204): It processes the incoming data to prepare it for analysis. This includes converting data into a standard format, adjusting its resolution, filtering out noise, and enhancing image and audio quality. This module ensures that the data is in an optimal state for feature extraction and analysis. The comprehensive preprocessing steps undertaken by this module are foundational to the system's effectiveness. Converting data to a unified format and enhancing its quality are critical steps that directly impact the accuracy of subsequent analyses. This module sets the stage for reliable feature extraction by ensuring that input data is in an optimal state, highlighting the importance of preprocessing in the overall authentication workflow. The methods include: +standardizeFormat( ), +convertFormat( ), +adjustResolution( ), +filterNoise( ), +segmentData( ), +enhanceImageAndAudio( ).

Smart Contract and Blockchain Integration (206): Manages the creation and association of smart contracts with the authenticated data. It utilizes blockchain technology to ensure data integrity and security, providing an immutable record of authentication decisions. The system's use of blockchain technology for managing smart contracts introduces an unparalleled level of security and transparency. Each piece of data is cryptographically linked to a unique smart contract, creating an immutable record of its authenticity. This approach not only secures the data but also builds trust among users by providing a verifiable trail of the authentication process. The methods include: +associateData( ), +employBlockchain( ), +createSmartContract( ), +manageSmartContract( ).

Historical Data and Engineered Mesh Generation (208, 210): Leveraging historical data for comparison purposes is a sophisticated strategy that enhances the system's ability to detect manipulations. The creation of an engineered mesh representation of the input data allows for a detailed and nuanced analysis, enabling the identification of subtle discrepancies that may indicate manipulation. This innovative approach showcases the system's depth of analysis and its capability to authenticate digital content with high precision. The methods include +retrieveData( ) and +generateMesh( ).

Feature Extraction and Analysis (212, 214): The utilization of Convolutional Neural Networks (CNNs) and Recurrent Neural Networks (RNNs) for feature extraction reflects the system's cutting-edge application of AI technologies. These neural networks are adept at identifying complex patterns and anomalies indicative of digital manipulation. The subsequent manipulation detection analysis leverages these extracted features, employing temporal and comparative analyses to discern authenticity. This illustrates the system's comprehensive and multi-layered approach to analysis, utilizing AI to uncover manipulations. The FeatureExtractionModule (212) methods include: +extractFeatures( ), +useCNN( ), +useRNN( ) and the ManipulationDetectionAnalysisModule (214) methods include: +compareFeatures( ), +identifyDiscrepancies( ), +performTemporalAnalysis( ).

Model Paraphrasing and Authentication Decision (216, 218): The Model Paraphrasing Module's role in reinterpreting data features adds an additional layer of scrutiny, enhancing the system's sensitivity to manipulations. This, combined with the Authentication Decision Module's final assessment, demonstrates the system's thorough and nuanced decision-making process. The incorporation of syntax and semantic analysis further bolsters the system's capability to authenticate textual content, showcasing its versatility and depth. The ModelParaphrasingModule (216) methods include +reinterpretFeatures( ), +performSyntaxAndSemanticAnalysis( ) and the AuthenticationDecisionModule (218) methods include +makeDecision( ).

SmartContractUpdateModule (220): Updates the smart contract associated with the data post-authentication decision. This ensures that the outcome of the authentication process is recorded in a secure and immutable manner on the blockchain. The methods include +updateSmartContract( ).

Output and Notification (222): The final step of outputting the authentication decision and notifying users is critical for user engagement and security. Implementing multi-factor authentication in response to detected manipulations illustrates the system's proactive stance on security. This mechanism ensures that users are not only informed of the authentication outcomes but are also part of a secure verification process when necessary. The methods to include: +outputDecision( ), +triggerSecurityProtocols( ), +notifyUsers( ), +implementMultiFactorAuthentication( ).

The class diagram in FIG. 2 illustrates a well-structured, object-oriented approach to designing a digital data authentication system. By detailing the functionalities and interactions of various modules, it provides a clear blueprint for how the system processes, analyzes, and authenticates digital data, leveraging advanced technologies and methodologies to ensure the integrity and security of digital content. The system is intricately designed, with each module playing a critical role in ensuring the integrity and authenticity of digital content. This detailed exploration underscores the system's reliance on advanced technologies and methodologies, from AI for deep analysis to blockchain for secure record-keeping, illustrating a comprehensive and robust approach to digital data authentication. The system's architecture not only addresses current challenges in digital security but also sets a foundation for future advancements in combating digital manipulation.

Figure 3:
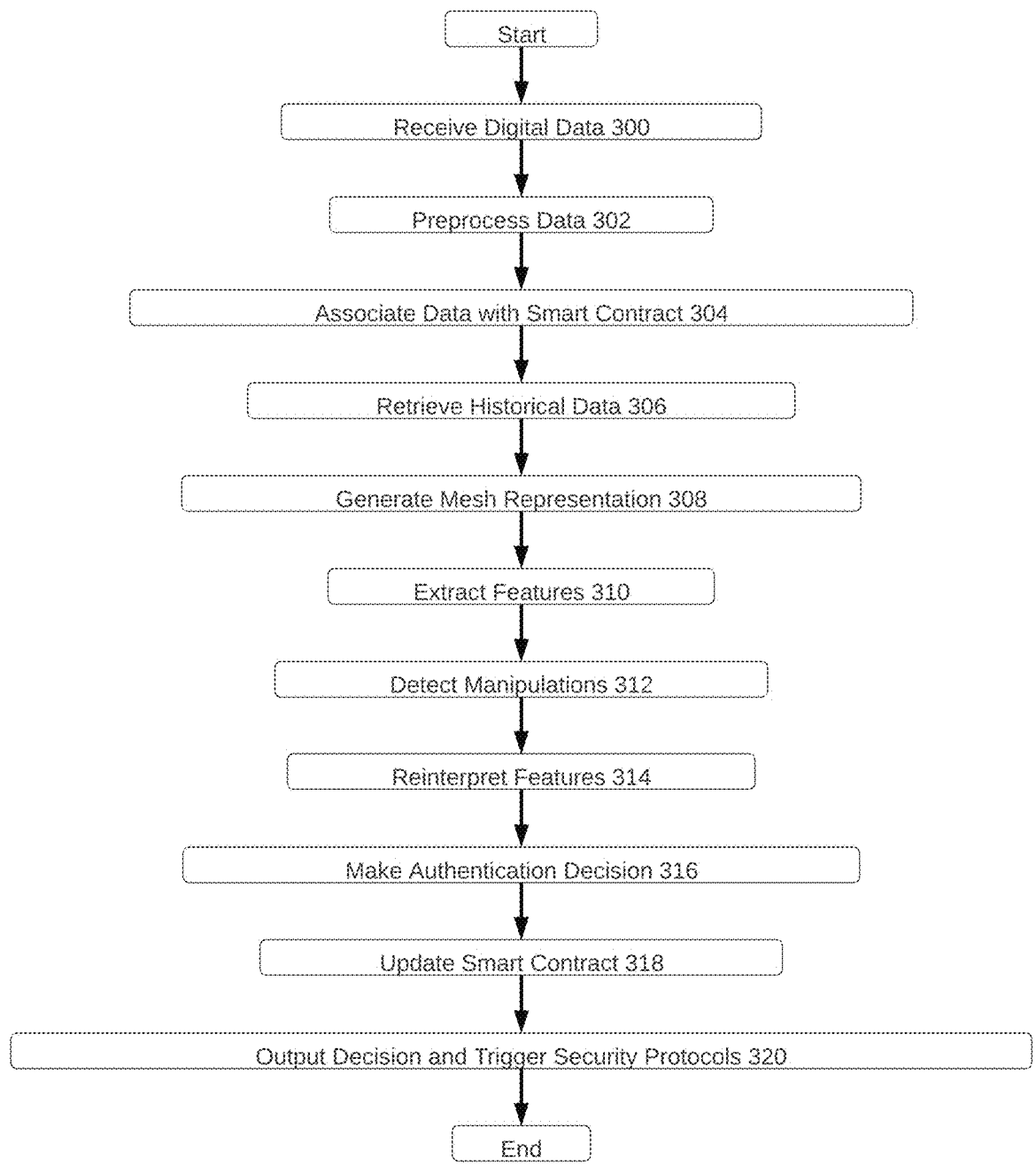
FIGS. 3-4 depict sample step-by-step processes from receiving digital data to making an authentication decision and outputting the decision, highlighting key steps like data preprocessing, smart contract association, historical data retrieval, mesh generation, feature extraction, manipulation detection, and smart contract updating.

By way of non-limiting disclosure, FIG. 3 outlines a process diagram for the authentication of digital data, providing a step-by-step overview of how digital content is processed, analyzed, and authenticated within the system. This sequential depiction highlights the flow from the initial reception of digital data to the final output of the authentication decision. The diagram is meticulously designed to showcase the intricacies of the process, ensuring a comprehensive understanding of the authentication mechanism. Here's a detailed description and explanation of each step outlined in the figure.

Start: The process begins when digital data is received, marking the initiation of the authentication workflow. This could include various forms of digital content such as images, audio, videos, or textual data submitted for verification.

Receive Digital Data (300): At this stage, the system collects digital data from users. This can occur through multiple channels, emphasizing the system's flexibility in accommodating data from diverse sources such as mobile applications, IoT devices, and online platforms.

Preprocess Data (302): Once the data is received, it undergoes preprocessing, which involves standardizing the format, adjusting the resolution, filtering noise, and enhancing the quality of images and audio. This step is crucial for preparing the data for accurate and effective analysis.

Associate Data with Smart Contract (304): In this step, the preprocessed data is associated with a smart contract. This association leverages blockchain technology to ensure the integrity and traceability of the data, embedding it within a secure and immutable ledger.

Retrieve Historical Data (306): The system retrieves relevant historical data for comparison. This historical data serves as a benchmark, providing a foundation for identifying potential discrepancies in the new data that may indicate manipulation.

Generate Mesh Representation (308): An engineered mesh representation of the digital data is generated. This structured form allows for a detailed examination of the content, facilitating the detection of any manipulative alterations.

Extract Features (310): Key features are extracted from the mesh representation, employing advanced algorithms and neural network technologies. This step isolates specific attributes of the data critical for the analysis of authenticity.

Detect Manipulations (312): The extracted features are analyzed for discrepancies against historical data. This manipulation detection analysis is pivotal in identifying alterations that suggest the data has been tampered with.

Reinterpret Features (314): Features or expressions within the data are reinterpreted, employing model paraphrasing techniques. This further analysis adds depth to the manipulation detection process, uncovering subtle signs of fraud that may not be initially apparent.

Make Authentication Decision (316): Based on the analysis, a decision is made regarding the authenticity of the data. This critical step determines whether the data is genuine or has been manipulated, guiding the subsequent actions of the system.

Update Smart Contract (318): Following the authentication decision, the associated smart contract is updated. This update is recorded on the blockchain, ensuring a secure and transparent record of the authentication outcome.

Output Decision and Trigger Security Protocols (320): The final step involves outputting the authentication decision. If manipulation is detected, security protocols are triggered, which may include notifying users, requiring additional verification, or other protective measures.

End: The process concludes following the output of the authentication decision, marking the completion of the digital data authentication workflow.

FIG. 3 meticulously illustrates the thorough and systematic approach employed by the system to authenticate digital data. Each step is integral to ensuring the integrity and security of digital content, showcasing the system's robust capabilities in combating digital manipulation and fraud. The use of blockchain technology for smart contracts, coupled with advanced analysis techniques, exemplifies the system's innovative and comprehensive strategy for maintaining trust in the digital realm.

Expanding on the foregoing discussion of FIG. 3, which delineates the process diagram for authenticating digital data, the following delves deeper into the systemic intricacies and technological frameworks that underpin this comprehensive authentication mechanism. This process not only showcases a multi-layered approach to securing digital content but also highlights the integration of cutting-edge technologies and methodologies designed to ensure the authenticity and integrity of digital interactions.

Integration of Blockchain Technology: The incorporation of blockchain through the association of digital data with smart contracts (Step 304) and the subsequent updating of these contracts (Step 318) is pivotal. Blockchain's immutable ledger provides a verifiable and tamper-proof record of each piece of data's authenticity, ensuring that once a piece of content is authenticated, its verification status is securely recorded and easily accessible. This not only enhances security but also builds trust among users by providing transparent access to the authentication outcomes. The smart contract mechanism acts as a binding agreement, ensuring that any manipulation after the initial authentication is easily detectable.

Advanced Preprocessing Techniques: Preprocessing data (Step 302) involves sophisticated techniques that go beyond simple format standardization or noise reduction. Utilizing AI-driven enhancements to improve image clarity or audio quality can significantly impact the system's ability to accurately extract and analyze features. For instance, deep learning models could be applied to enhance low-resolution images, making it easier to detect subtle manipulations that might otherwise go unnoticed. This step is crucial in preparing data for the intricate analysis that follows, highlighting the importance of high-quality input data for effective authentication.

Engineered Mesh Representation: Generating an engineered mesh representation (Step 308) is a technologically advanced method that converts digital data into a structured form, allowing for a granular analysis of content. This could involve creating three-dimensional models of images or videos, or detailed spectral graphs for audio files, facilitating the identification of anomalies indicative of manipulation. This step is where the technological sophistication of the system truly shines, leveraging computational geometry and advanced graphics processing to dissect and examine digital content at a fundamental level.

Comprehensive Feature Extraction and Analysis: The feature extraction (Step 310) and manipulation detection analysis (Step 312) represent the core analytical capabilities of the system. Employing neural networks (such as CNNs for visual content and RNNs for sequential data like audio) enables the system to identify patterns and discrepancies that human analysts might miss. This AI-powered analysis is critical for uncovering sophisticated manipulative techniques, including those employed in the creation of deepfakes. The system's ability to learn from historical data and apply these learnings to new content underscores its adaptability and evolving nature, ensuring its effectiveness against emerging manipulation technologies.

Decision-making and Security Protocols: The decision-making process (Step 316) is informed by a comprehensive analysis that considers both the extracted features and the reinterpretation of these features (Step 314) through model paraphrasing. This multi-faceted approach ensures a robust evaluation of the data's authenticity, reflecting the system's commitment to accuracy and reliability. When manipulation is detected, the system's response (Step 320) goes beyond simple notification; it may involve complex security protocols designed to protect users and the integrity of the platform. This could include additional layers of verification, restrictions on content dissemination, or the initiation of investigative procedures to determine the source of the manipulation.

The Role of User Engagement: Lastly, the user engagement aspect, particularly in the context of security protocols triggered by detected manipulations, underscores the system's holistic approach to digital security. By actively involving users in the verification process (for instance, through multi-factor authentication or direct notifications), the system not only enhances security but also fosters a culture of awareness and responsibility regarding digital content authenticity.

The FIG. 3 process diagram encapsulates a sophisticated and comprehensive approach to digital data authentication. Through the integration of blockchain technology, advanced preprocessing, AI-driven analysis, and proactive security measures, the system offers a robust defense against digital manipulation. This detailed process not only secures digital content but also sets a precedent for future innovations in digital authentication, ensuring the continued trust and integrity of digital interactions in an increasingly digitalized world.

Figure 4:
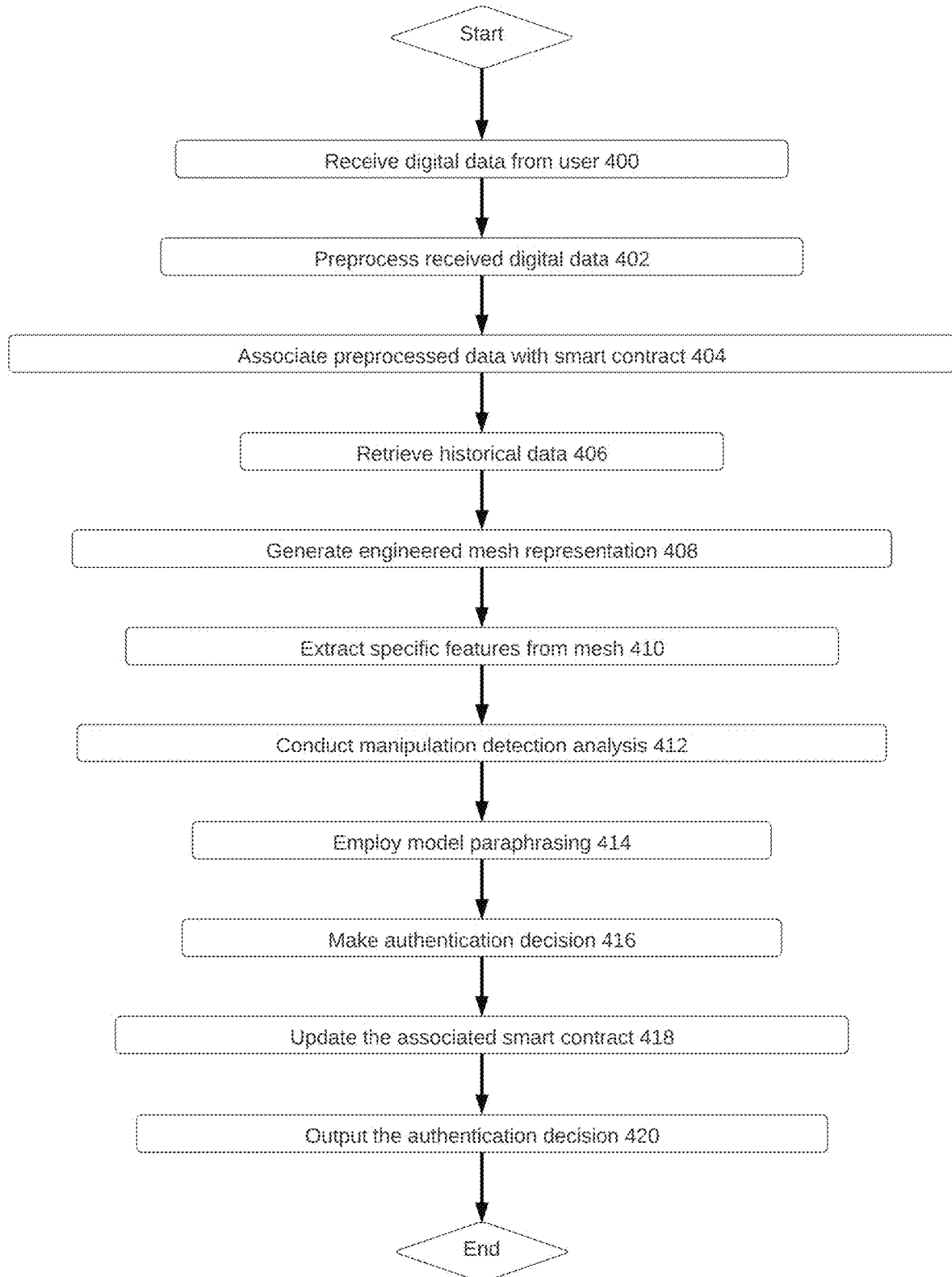

By way of non-limiting disclosure, FIG. 4 provides a structured flow diagram detailing the step-by-step process for authenticating digital data, with a focus on combating the challenges posed by digital manipulation, such as deepfake technology. This diagram illustrates a clear, sequential approach to processing, analyzing, and ultimately determining the authenticity of digital content submitted to the system. The process aims to ensure the integrity and security of digital transactions and interactions by meticulously scrutinizing the data for any signs of manipulation.

Initial Data Receipt and Preprocessing
   a. Receiving Digital Data from Users (400): The entry point of the process is critically designed to accommodate a wide array of digital formats and sources. This inclusivity ensures that regardless of how the data is generated or collected (from high-resolution cameras to mobile devices), the system is equipped to handle it. This step underscores the challenge of digital diversity and the need for a robust system capable of adapting to various data qualities and formats.
   b. Preprocessing Received Digital Data (402): Preprocessing is more than just standardizing the data; it involves sophisticated algorithms to enhance the data's quality, making it suitable for detailed analysis. Techniques such as super-resolution for images or noise cancellation for audio files can be employed to improve the fidelity of the input data. This enhancement is crucial for ensuring that subsequent analyses are based on the highest quality data possible, minimizing the risk of false positives or negatives in manipulation detection.

Blockchain Integration and Historical Data Comparison
   a. Association with Smart Contract (404): The association of data with smart contracts introduces a layer of security and accountability that is immutable and transparent. This blockchain integration is pivotal for creating a trustless environment where the authenticity of data can be verified independently by any party, fostering trust in the digital ecosystem.
   b. Retrieving Historical Data (406): This step leverages big data analytics to compare the current data with vast repositories of historical data. The ability to access and analyze such repositories in real-time demands high-performance computing resources and sophisticated algorithms capable of identifying relevant comparators and discerning normal variations from potential manipulations.

Engineered Mesh, Feature Extraction, and Analysis
  a. Generation of Engineered Mesh Representation (408): Creating an engineered mesh from digital content is a complex process that transforms traditional data into a format ripe for analytical scrutiny. This transformation involves advanced computational models that can dissect the data into a mesh structure, allowing for a multi-dimensional analysis that is particularly effective at revealing manipulations that alter the fundamental characteristics of the data.
  b. Feature Extraction (410) and Manipulation Detection Analysis (412): The extraction of specific features and their subsequent analysis for manipulation detection embody the application of machine learning and AI at its finest. By training models on known authentic and manipulated datasets, the system learns to detect subtle cues and patterns indicative of manipulation. This learning process is iterative, with the system continuously updating its models based on new data, ensuring its efficacy remains high even as manipulation techniques evolve.

Decision-Making, Blockchain Update, and Output
  a. Employing Model Paraphrasing and Making Decisions (414, 416): Model paraphrasing involves a re-evaluation of the data, perhaps looking at it through different AI models or from different analytical perspectives to ensure that no stone is left unturned in the quest for authenticity. The decision-making step that follows is the culmination of this comprehensive analysis, determining the fate of the data based on a wealth of gathered and processed information.
  b. Updating the Smart Contract (418): Post-decision, updating the smart contract ensures that the authentication outcome is recorded in an unalterable and publicly verifiable manner. This step is crucial for maintaining a ledger of authenticity that can be referenced in future verifications, adding to the collective trust in the system.
  c. Outputting the Authentication Decision (420): The final output is more than just a verdict on the data's authenticity; it's a statement of trustworthiness issued by the system. Depending on the outcome, this step might trigger various protocols, such as alerting the submitter to potential issues, engaging security measures, or even initiating legal processes in cases of deliberate fraud.

Thus, FIG. 4 illustrates a sophisticated and comprehensive process designed not just to detect and deter digital manipulation but to do so in a way that builds and maintains trust in the digital content ecosystem. The integration of blockchain technology for immutability, the application of AI and machine learning for deep analysis, and the use of high-performance computing for real-time data processing all contribute to a robust system capable of adapting to the ever-evolving landscape of digital fraud and manipulation. This process not only protects the integrity of digital content but also ensures the continuity of trust in digital interactions, a critical component in today's increasingly digital world.

Figure 5:
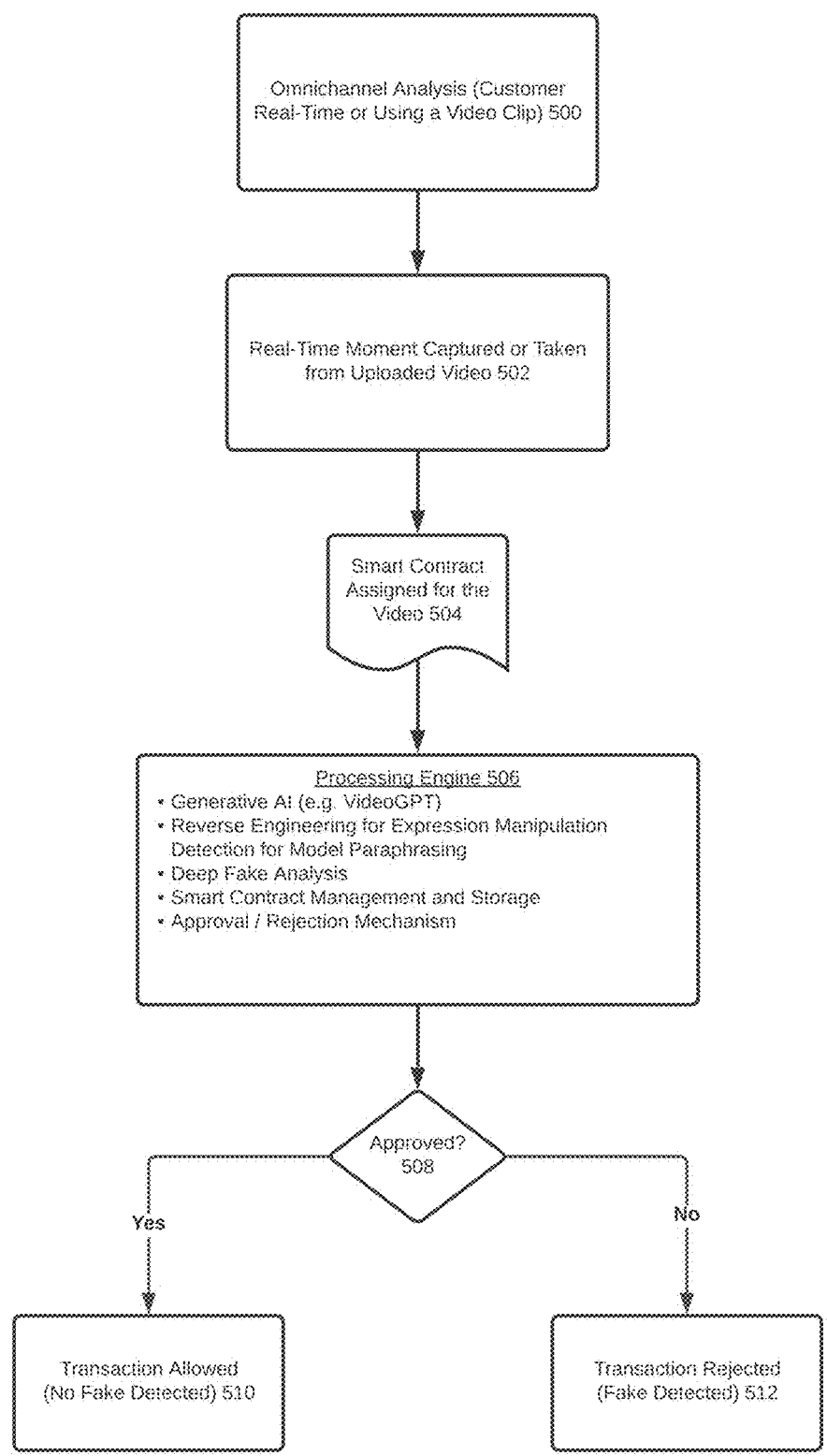
FIG. 5 depicts a sample logical flow diagram that the logical flow for analyzing omnichannel inputs (e.g., customer interactions via real-time video or uploads) using generative AI, reverse engineering, and smart contract management to determine the authenticity of digital content.

By way of non-limiting disclosure, FIG. 5 presents a logical flow diagram that illustrates a specialized process for analyzing and authenticating digital data, particularly focusing on real-time or recorded video clips submitted by users through various channels. This process is designed to combat the sophisticated challenge of deepfakes and other forms of digital manipulation, leveraging advanced technologies such as Generative AI, reverse engineering, and smart contract management.

Omnichannel Analysis (Customer Real-Time or Using a Video Clip) (500): The system begins with an omnichannel approach, capable of accepting customer submissions through diverse channels. This inclusivity ensures that whether a user is interacting in real-time or through pre-recorded clips, the system is equipped to handle the input efficiently. This step highlights the system's adaptability, catering to the modern user's varied preferences for digital communication.

Real-Time Moment Captured or Taken from Uploaded Video (502): This involves the system's capability to process both live captures and uploaded videos. Handling real-time data requires the system to operate with minimal latency, applying its analytical capabilities on-the-fly. For uploaded videos, it implies a robust infrastructure capable of storing, retrieving, and processing large data volumes efficiently. This dual capability underscores the system's versatility in dealing with dynamic digital content landscapes.

Smart Contract Assigned for the Video (504): Assigning a smart contract for each video submission embeds the authentication process within a blockchain framework, ensuring that every piece of content is tracked, authenticated, and secured with transparency and immutability. This step is crucial for establishing a verifiable record of the video's authenticity, providing a solid foundation for trust in the content's integrity.

Processing Engine (506): The core of the system, the Processing Engine, employs various sophisticated technologies:
  a. Generative AI (VideoGPT): Utilized for analyzing video content, potentially for generating counterexamples or for understanding the nuances of video manipulations.
  b. Reverse Engineering for Expression Manipulation Detection: A critical component for identifying and analyzing the alterations made to the video's natural expressions, aiming to pinpoint manipulation signatures.
  c. Deep Fake Analysis: Specifically focuses on detecting deepfakes by examining the fidelity of the video to reality, looking for common deepfake artifacts or inconsistencies.
  d. Smart Contract Management and Storage: Manages the blockchain aspects, ensuring that each video's authentication status is securely and immutably logged.
  e. Approval/Rejection Mechanism: Decides the authenticity of the video, either approving it as genuine or rejecting it due to detected manipulations.

Decision Outcome (Approved? 508): This decision point plays a pivotal role in the system, determining whether the video content is authentic and free from manipulations. Based on the comprehensive analysis by the processing engine, videos are either approved as genuine or flagged for containing manipulations. This binary outcome dictates the next steps in the process, branching into two distinct pathways.

Transaction Allowed (No Fake Detected) (510) and Transaction Rejected (Fake Detected) (512): If the video is approved, the transaction or interaction that the video facilitates is allowed to proceed, reinforcing the system's role in enabling secure digital interactions. Conversely, if the video is flagged as manipulated (fake), the transaction is rejected, and appropriate measures are taken. This may include notifying the user, initiating further investigation, or recording the attempt for security purposes.

The logical flow depicted in FIG. 5 underscores the system's comprehensive approach to ensuring digital content authenticity, from submission through to the final decision. By integrating advanced technologies like Generative AI and blockchain, alongside sophisticated analytical techniques for manipulation detection, the system provides a robust defense against the ever-evolving threat of digital manipulation.

This process not only safeguards the integrity of digital interactions but also fosters a secure and trustworthy digital environment. The dual pathway following the approval decision point highlights the system's precision in distinguishing genuine content from manipulated, ensuring that only authentic interactions are facilitated. Through this meticulous and advanced approach, the system stands as a bulwark against the challenges posed by deepfakes and other sophisticated digital frauds, maintaining the sanctity of digital authenticity in an increasingly virtual world.

Figure 6:
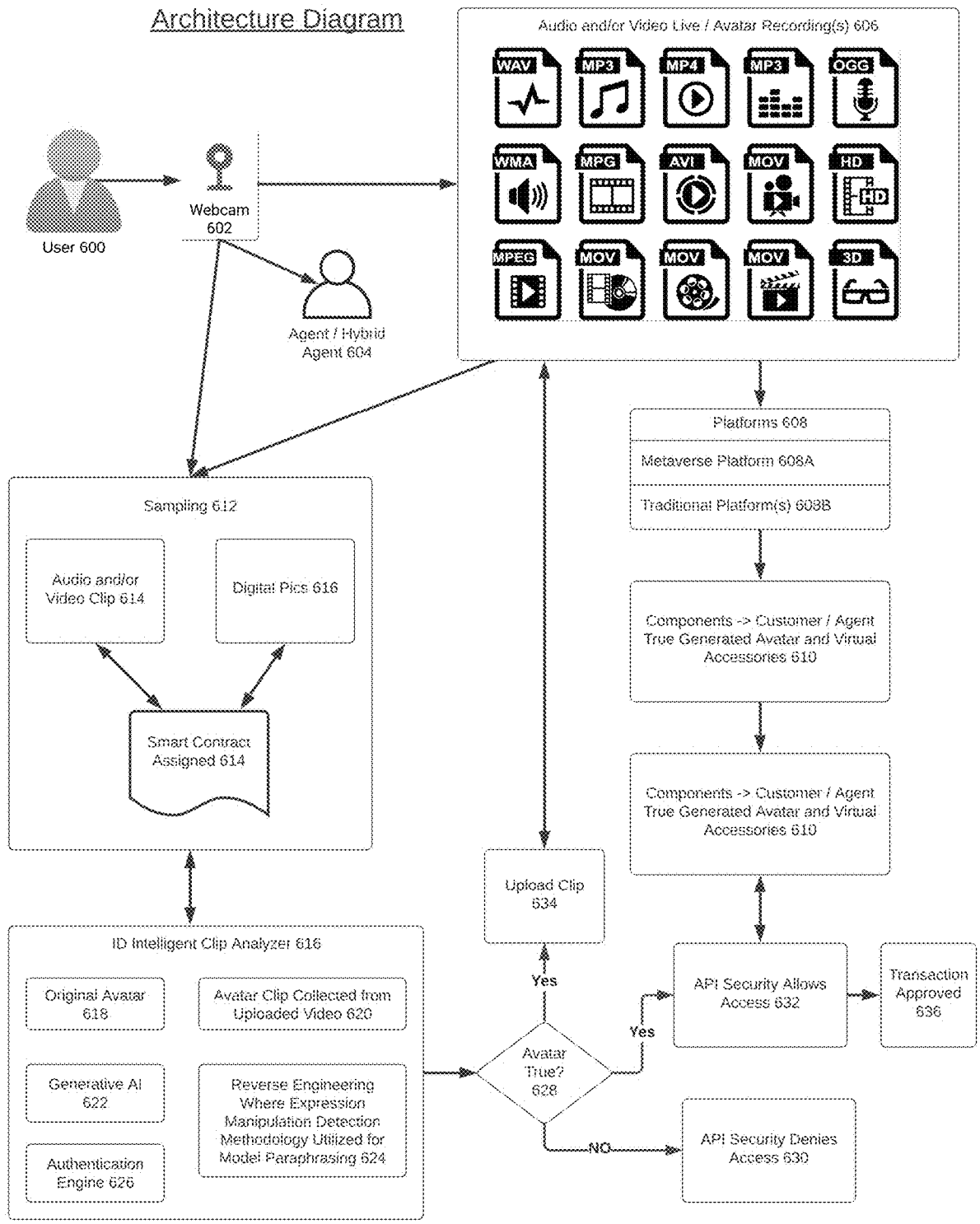
FIG. 6 depicts a sample architecture diagram that focuses on the system's application in environments with live audio/video recordings or avatars, showing how data from various sources (e.g., webcams, agents, platforms) is processed through sampling, intelligent clip analysis, generative AI, and authentication engines to validate digital identities.

By way of non-limiting disclosure, FIG. 6 outlines an intricate architecture diagram focused on the process of authenticating audio and/or video live/avatar recordings through a combination of user interaction, technological processes, and blockchain integration. This system is specifically designed to address the authentication of digital avatars and recordings in environments that may include live interactions or contributions from virtual platforms, such as the Metaverse. Here's an expanded discussion on the components and their interconnections within this authentication system.

User Interaction and Initial Data Collection:
  a. User (600): The process initiates with the user, who is the source of digital content (audio, video, digital pics) that needs authentication. This user can interact through various devices and platforms, highlighting the system's adaptability to diverse input methods.
  b. Webcam (602)/Agent or Hybrid Agent (604): Users may submit their content through direct recordings via webcams or through agents (either AI-driven or human) that facilitate the interaction. This flexibility ensures that the system can authenticate data from both direct user submissions and mediated interactions, accommodating a wide range of use cases.

Data Processing and Analysis:
  a. Sampling (612) and Audio/Video Clip (614)/Digital Pics (616): Submitted content is processed, involving sampling and categorization into clips or pictures for analysis. This step is crucial for breaking down the content into manageable pieces for detailed examination.
  b. Platforms (608) including Metaverse Platform (608A) and Traditional Platform(s) (608B): The system recognizes content originating from both emerging platforms like the Metaverse and traditional digital platforms, indicating its forward-looking approach to content authentication in varied virtual environments.
  c. Components→Customer/Agent True Generated Avatar and Virtual Accessories (610): This highlights the system's capability to analyze components of digital avatars, including any virtual accessories, for authenticity. This is particularly relevant in environments like the Metaverse, where avatars represent users.

Blockchain Integration and Smart Contracts:
  a. Smart Contract Assigned (614): Every piece of content is assigned a smart contract, anchoring it within the blockchain for immutable record-keeping. This ensures the integrity and traceability of the authentication process.
  b. ID Intelligent Clip Analyzer (616): A sophisticated AI-driven module analyzes the content against known benchmarks and historical data to detect any signs of manipulation or inauthenticity.

Authentication Decision Process:
  a. Original Avatar (618)/Avatar Clip Collected from Uploaded Video (620): The system compares the submitted content against original avatars or previously authenticated clips to identify discrepancies.
  b. Generative AI (622): Employs advanced AI algorithms to generate or analyze content, aiding in the detection of deepfakes or other manipulations.
  c. Authentication Engine (626) and Reverse Engineering for Expression Manipulation Detection (624): These components work together to authenticate the content, employing reverse engineering to identify any discrepancies in expressions or behavior that might indicate manipulation.

Decision Outcomes and Security Protocols:
  a. Avatar True? (628): A decision point determining the authenticity of the avatar. If true, the process moves towards transaction approval; if not, it triggers security protocols.
  b. API Security Allows Access (632)/Denies Access (630): Based on the authenticity decision, API security mechanisms either grant access for further transactions or interactions or deny access as a protective measure against fraudulent content.
  c. Transaction Approved (636): The final step for content that is authenticated as genuine, enabling the user to proceed with their intended digital interactions securely.

The architecture depicted in FIG. 6 illustrates a highly sophisticated system designed to authenticate digital content in environments rich with user-generated media and avatars. By leveraging advanced AI for deep analysis, integrating blockchain technology for secure and transparent record-keeping, and employing detailed processes for content examination, the system ensures a high level of security and trustworthiness in digital interactions.

This comprehensive approach not only addresses the current challenges of digital content authentication, particularly in the context of rapidly evolving virtual environments like the Metaverse, but also lays a foundational framework for future advancements in digital identity verification. Through its meticulous design and integration of cutting-edge technologies, the system stands as a robust solution to maintaining the integrity and authenticity of digital personas and interactions in an increasingly virtual world.

Figure 7:
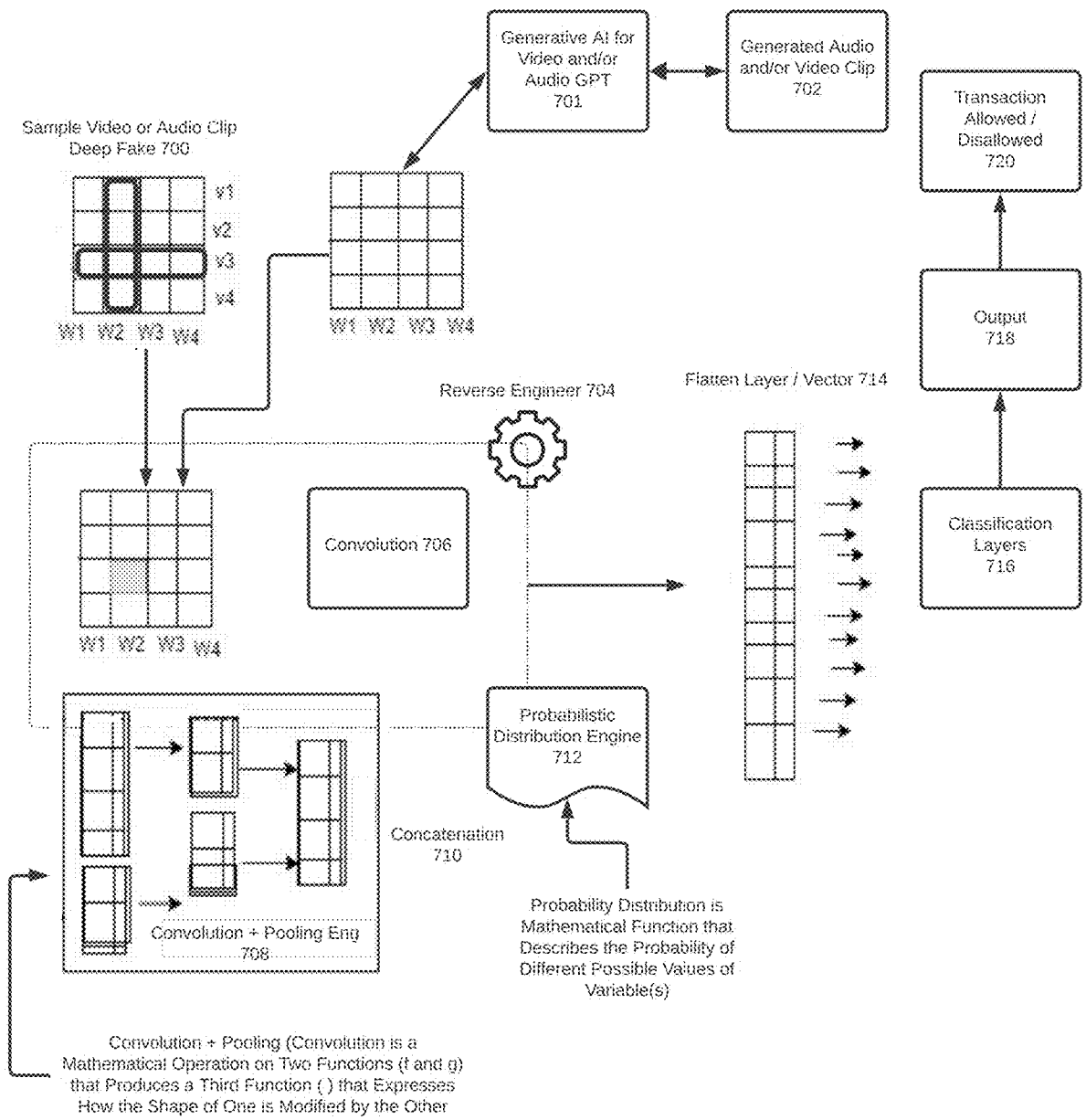
FIG. 7 depicts a sample reverse engineering diagram that illustrates the reverse engineering process using manipulation detection methodology for model paraphrasing. It shows how sample video or audio clips are analyzed through generative AI, convolution, and probabilistic distribution engines to determine authenticity and make transaction decisions.

Last, by way of non-limiting disclosure, FIG. 7 delves into the reverse engineering process using manipulation detection methodology for model paraphrasing, specifically tailored to tackle the challenges posed by deepfake technology and other forms of digital content manipulation. This architecture diagram intricately lays out the steps and technologies involved in analyzing and authenticating audio or video clips, highlighting a system's approach to identifying and addressing digital manipulations.

Core Components and Initial Analysis:
  a. Sample Video or Audio Clip—Deep Fake (700): The process begins with the submission of a sample clip suspected of being a deepfake. This initial input represents the critical challenge the system aims to address-distinguishing between authentic and manipulated content.

b. Generative AI for Video and/or Audio GPT (701): At this stage, Generative AI technologies, such as VideoGPT for videos or similar models for audio, are employed. These AI tools are instrumental in analyzing the clip's characteristics, potentially recreating the conditions under which the clip was generated to understand the depth and nature of the manipulation.

c. Generated Audio and/or Video Clip (702): The output from the generative AI analysis provides a basis for comparison, offering insights into how the original clip might have been altered. This step is crucial for establishing a reference point against which the suspected deepfake can be evaluated.

Reverse Engineering and Manipulation Detection:

a. Reverse Engineer (704): This component signifies the core of the process, where the system attempts to deconstruct the clip back to its presumed original state or to understand the manipulative techniques applied. This reverse engineering is key to uncovering the fingerprints of digital manipulation.

b. Convolution (706) and Convolution+Pooling Eng (708): These steps involve applying convolutional operations to the data, a common technique in neural networks to extract features from images and audio. Pooling further refines these features by reducing their dimensionality, enhancing the system's ability to focus on the most relevant information for detecting manipulation.

c. Concatenation (710): This process combines features from different layers or sections of the analysis, amalgamating the extracted information into a comprehensive dataset that provides a fuller picture of the potential manipulations.

d. Probabilistic Distribution Engine (712): Utilizes statistical models to estimate the likelihood of various features or elements within the clip being genuine or manipulated. This engine assesses the probability distribution of the data's characteristics, aiding in the identification of anomalies indicative of manipulation.

e. Flatten Layer/Vector (714): A process that transforms the pooled and concatenated features into a flat vector, simplifying the dataset for further analysis. This step is essential for preparing the data for classification.

f. Classification Layers (716): Here, the system categorizes the analyzed features into distinct classes-likely authentic or manipulated. This classification is based on the training the system has received, using known examples of deepfakes and genuine clips to distinguish between genuine and manipulated content accurately.

Outcome Determination and Final Steps:

a. Output (718): The culmination of the analysis process, where the system presents its findings. This output indicates whether the clip is likely to be a deepfake, based on the reverse engineering and analysis conducted.

b. Transaction Allowed/Disallowed (720): Based on the output, a decision is made regarding the clip's authenticity. If deemed authentic, transactions or interactions associated with the clip are allowed to proceed. Conversely, if manipulation is detected, the system disallows the transaction, potentially triggering further review or security measures.

FIG. 7 presents a sophisticated architecture for detecting and analyzing digital manipulations in audio and video content. Through a combination of advanced AI techniques, including generative models, convolutional operations, and classification algorithms, the system peels back the layers of potential manipulation to determine the authenticity of digital content. This detailed approach not only addresses the immediate challenge of identifying deepfakes but also contributes to a broader understanding of digital authenticity, ensuring the integrity of digital interactions in an era where digital manipulation technologies are becoming increasingly sophisticated.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for authenticating digital data against manipulations, the method comprising the steps of:

receiving digital data from users through an omnichannel input process, wherein the digital data includes at least one of a video file, an audio file, or a textual content file, the omnichannel input process facilitating reception of data via various platforms including mobile applications, Internet of Things (IoT) devices, web interfaces, and online services, thereby accommodating a broad spectrum of user interaction modes;

standardizing format of the received digital data for analysis through a preprocessing process, including operations such as converting formats to a unified standard format, adjusting resolution to meet analysis requirements, filtering noise to enhance clarity, and segmenting the data into manageable parts for efficient processing, thereby preparing the data for detailed analysis;

associating preprocessed digital data with a unique smart contract to secure data integrity and authenticity throughout an authentication process, using a smart contract association process that involves generating a unique identifier for the data via cryptographic hashing and embedding this identifier within a blockchain-based smart contract, ensuring an immutable record of the data's authenticity;

retrieving historical data corresponding to the user or type of digital data for use as a benchmark in the authentication process, through a historical data retrieval process that leverages content delivery networks (CDNs) and optimized data storage solutions to quickly access extensive datasets of authenticated data, providing a robust framework for comparison;

generating an engineered mesh representation of the preprocessed digital data, mapping out key features and expressions pertinent to the data's authenticity, using an engineered mesh generation process that creates a detailed structural model for video data or a spectral graph for audio data, enabling a comprehensive analysis of data originality;

extracting specific features from the engineered mesh for manipulation detection analysis, using a feature extraction process that employs deep neural networks to identify and isolate features indicative of potential manipulations, focusing on anomalies in facial expressions, voice modulation, and textual consistency;

comparing the extracted features against the historical data and identifying discrepancies indicative of manipulations through a manipulation detection analysis process, utilizing advanced artificial intelligence (AI) and machine learning models trained on datasets of both authentic and manipulated content, ensuring high accuracy in detecting deepfake technology and other forms of digital tampering;

reinterpreting the features or expressions of the digital data in various contexts to uncover subtle manipulations, through a model paraphrasing process that includes linguistic analysis for textual data and dynamic analysis for video and audio data, allowing for the detection of manipulations that may not be apparent in a static analysis;

making a decision on the authenticity of the digital data based on the manipulation detection analysis and model paraphrasing, using an authentication decision process that incorporates a confidence scoring mechanism to evaluate a degree of similarity between current data and historical benchmarks, setting thresholds for automatically flagging potential manipulations;

updating the associated smart contract with the outcome of the authentication decision, securing a record of the process and its result, through a smart contract update process that includes recording the decision on the blockchain, thereby ensuring transparency and non-repudiation of the authentication outcome; and outputting the authentication decision and triggering security protocols if manipulation is detected, using an output process that involves notifying the user via multiple communication channels, including email and SMS, and implementing a multi-factor authentication process to verify user identity and intent, ensuring a secure and user-informed response to detected manipulations.

2. A system for authenticating digital data against manipulations, comprising:

a memory; and one or more processors that are configured to execute modules that are stored in the memory, wherein the modules, when executed, cause the one or more processors to:

an omnichannel input module configured to receive digital data from users, wherein the digital data includes at least one of a video file, an audio file, or a textual content file;

a preprocessing module configured to standardize the format of the received digital data for analysis, including functionalities for format conversion, resolution adjustment, noise filtering, or segmenting the data;

a smart contract module configured to associate the preprocessed digital data with a unique smart contract to secure the data's integrity and authenticity throughout the authentication process;

a historical data module configured to retrieve historical data corresponding to the user or the type of digital data for use as a benchmark in the authentication process;

an engineered mesh generation module configured to generate an engineered mesh representation of the preprocessed digital data, mapping out key features and expressions pertinent to the data's authenticity;

a feature extraction module configured to extract specific features from the engineered mesh for manipulation detection analysis;

a manipulation detection analysis module utilizing advanced artificial intelligence (AI) and machine learning models to compare the extracted features against the historical data and identify discrepancies indicative of manipulations;

a model paraphrasing module configured to reinterpret the features or expressions of the digital data in various contexts to uncover subtle manipulations;

an authentication decision module configured to make a decision on the authenticity of the digital data based on the manipulation detection analysis and model paraphrasing;

a smart contract update module configured to update the associated smart contract with the outcome of the authentication decision, securing a record of process and its result; and an output module configured to output the authentication decision and trigger security protocols if manipulation is detected.

3. The system of claim 2, wherein the omnichannel input module includes integration with mobile applications, Internet of Things (IoT) devices, and online services to facilitate the reception of digital data from a wide range of user interfaces.

4. The system of claim 3, wherein the smart contract module employs a blockchain platform for creation and management of the unique smart contracts, enhancing transparency and security of a data authentication process.

5. The system of claim 4, wherein the manipulation detection analysis module further comprises a temporal analysis feature capable of analyzing changes in the digital data over time to detect manipulations not evident in static analysis.

6. The system of claim 5, wherein the model paraphrasing module includes a linguistic analysis tool for textual content, configured to perform syntax and semantic analysis to detect generated or manipulated textual data.

7. The system of claim 6, wherein the output module is configured to notify users via multiple communication channels, including email and SMS, and implement a multi-factor authentication process for users when manipulation is detected in submitted digital data.

8. The system of claim 7, wherein the feature extraction module is configured to utilize convolutional neural networks (CNNs) for the analysis of video files and recurrent neural networks (RNNs) for the analysis of audio files, enabling the system to identify nuanced patterns indicative of digital manipulation that might be missed by traditional analysis methods.

9. The system of claim 6, wherein the preprocessing module further includes an image and audio enhancement feature that employs machine learning techniques to improve clarity and definition of visual and auditory elements within the digital data, thereby facilitating more precise feature extraction and manipulation detection.

10. A method for authenticating digital data against manipulations, the method comprising the steps of:

receiving digital data from a user through an omnichannel platform, wherein the digital data comprises at least one of a video file, an audio file, or a textual content file;

preprocessing the received digital data to standardize its format for analysis, including at least one of format conversion, resolution adjustment, noise filtering, or segmenting the data;

associating the preprocessed digital data with a unique smart contract, wherein the smart contract serves to secure integrity and authenticity of the digital data throughout the authentication process;

retrieving historical data corresponding to the user or the type of the digital data, wherein the historical data comprises previously authenticated versions of similar data types for use as a benchmark in the authentication process;

generating an engineered mesh representation of the preprocessed digital data, wherein the engineered mesh maps out key features and expressions pertinent to the digital data's authenticity;

extracting specific features from the engineered mesh for manipulation detection analysis, wherein the features extracted are indicative of potential manipulations in the digital data;

conducting a manipulation detection analysis on the extracted features using advanced artificial intelligence (AI) and machine learning models, wherein the analysis compares the extracted features against the historical data to identify discrepancies indicative of manipulations;

employing model paraphrasing to reinterpret the features or expressions of the digital data in various contexts to uncover subtle manipulations not immediately evident through direct comparison;

making an authentication decision based on the manipulation detection analysis and the model paraphrasing, wherein the decision determines the authenticity of the digital data;

updating the associated smart contract with the outcome of the authentication decision, thereby securing a record of the authentication process and its result; and outputting the authentication decision, wherein if the digital data is verified as authentic, it is approved for its intended use, and if manipulation is detected, security protocols are triggered to address the manipulation.

11. The method of claim 10, wherein the preprocessing further includes enhancing the clarity and definition of the digital data using advanced digital signal processing techniques to facilitate more accurate feature extraction.

12. The method of claim 11, wherein the unique smart contract is created on a blockchain platform, providing a decentralized verification mechanism to enhance security and transparency of the digital data's authenticity.

13. The method of claim 12, involving the use of cryptographic hash functions to generate a unique identifier for the preprocessed digital data before association with the smart contract, ensuring the data's integrity from point of upload.

14. The method of claim 13, wherein the retrieval of historical data is optimized through the use of a content delivery network (CDN) to reduce latency in accessing large datasets, thereby speeding up the authentication process.

15. The method of claim 14, wherein the engineered mesh representation includes a three-dimensional model for video data or a spectral graph for audio data, enabling a multi-dimensional analysis of the digital data for enhanced manipulation detection.

16. The method of claim 15, wherein the feature extraction employs deep neural networks trained specifically to identify discrepancies between the digital data and its historical counterparts, focusing on subtle manipulations indicative of advanced deepfake technologies.

17. The method of claim 16, further incorporating temporal analysis of the digital data, wherein changes over time are analyzed to detect manipulations that may not be evident in a single frame or segment, adding a dynamic component to the manipulation detection analysis.

18. The method of claim 17, wherein the model paraphrasing step includes linguistic analysis for textual content, analyzing syntax and semantics to detect unnatural patterns or inconsistencies that could indicate text-based manipulation or generated content.

19. The method of claim 18, wherein the decision-making for determining the authenticity of the digital data includes a confidence scoring mechanism, wherein scores are assigned based on the degree of similarity to historical data, and thresholds are set to automatically flag potential manipulations.

20. The method of claim 19, wherein the security protocols triggered in response to detected manipulations include notifying the user via multiple channels, including email and SMS, and requiring a secondary form of verification before proceeding with a transaction or interaction.

\* \* \* \* \*